Figure 1:
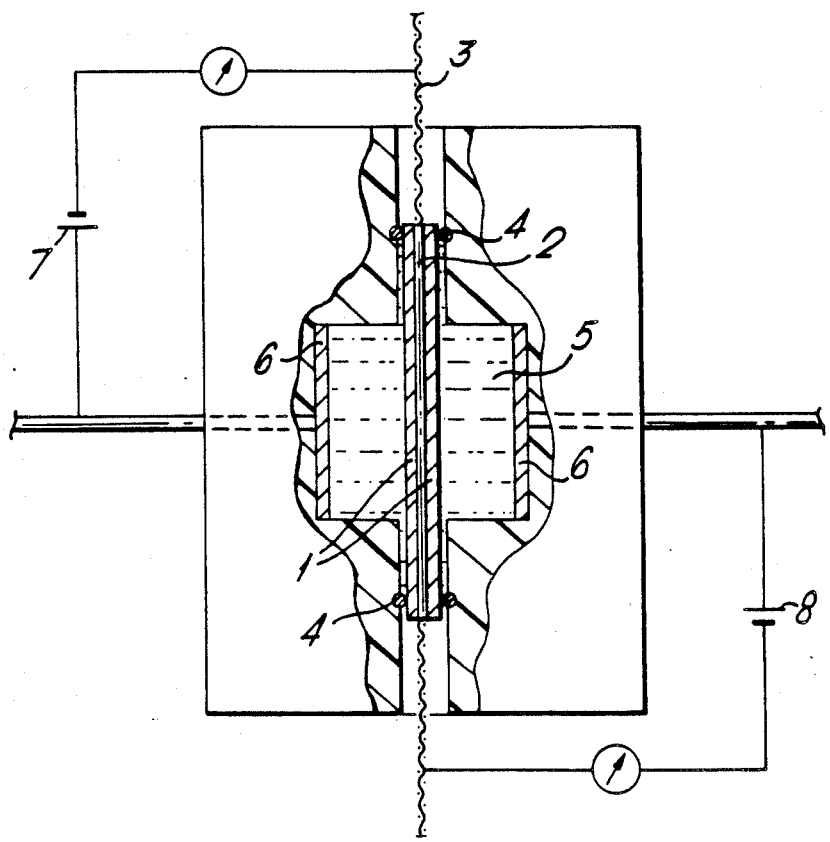

United States Patent [19]

McLoughlin et al.

[11] Patent Number: 4,882,828
[45] Date of Patent: Nov. 28, 1989

[54] PROTECTION OF SENSITIVE MATERIAL

[75] Inventors: Robert H. McLoughlin; George B. Park, both of Swindon; John Cook, Faringdon, all of United Kingdom; Stephen E. Myers; San Carlos, Calif.

[73] Assignee: Scimat Limited, United Kingdom

[21] Appl. No.: 349,888

[22] Filed: May 5, 1989

Related U.S. Application Data

[63] Continuation of Ser. No. 210,142, Jun. 15, 1988, abandoned, which is a continuation of Ser. No. 618,092, Jun. 7, 1984, abandoned.

[30] Foreign Application Priority Data

Nov. 2, 1983 [GB] United Kingdom ................ 8329210
Dec. 15, 1983 [GB] United Kingdom ................ 8333386

[51] Int. Cl.⁴ .............................................. H01M 4/04
[52] U.S. Cl. .................... 29/623.1; 29/623.3; 429/137; 429/246
[58] Field of Search ................. 29/623.1, 623.3; 429/136, 137, 246

[56] References Cited

U.S. PATENT DOCUMENTS

| | | | |
|---|---|---|---|
| 1,376,034 | 4/1921 | Palmer . | |
| 1,402,070 | 1/1922 | Hoppie . | |
| 2,763,759 | 9/1956 | Mito et al. | 264/154 |
| 2,866,841 | 12/1958 | Zahn | 429/139 |
| 2,942,050 | 6/1960 | Demes . | |
| 3,050,576 | 8/1962 | Comanor | 429/136 |
| 3,081,212 | 3/1963 | Taylor et al. | 156/229 |
| 3,385,736 | 5/1968 | Delbert | 264/49 |
| 3,391,044 | 7/1968 | Kaghan et al. | 264/22 |
| 3,418,168 | 12/1968 | Wentworth | 264/49 |
| 3,721,113 | 3/1973 | Hovsepian . | |
| 3,846,521 | 11/1974 | Osterholz | 264/22 |
| 3,892,594 | 7/1975 | Charlesby et al. | 429/137 |
| 3,929,509 | 12/1975 | Taskier | 429/246 |
| 4,149,064 | 4/1979 | Houska et al. | 219/121 LJ |
| 4,252,756 | 2/1981 | Riesberg | 264/49 |
| 4,306,927 | 12/1981 | Funk et al. | 156/244.11 |
| 4,328,410 | 5/1982 | Slivinsky et al. | 219/121 LH |
| 4,357,262 | 11/1982 | Solomon | 264/49 |
| 4,379,772 | 4/1983 | Solomon | 264/49 |
| 4,563,565 | 1/1986 | Kampfer et al. | 219/121 LJ |
| 4,594,299 | 6/1986 | Cook et al. | 429/129 |

FOREIGN PATENT DOCUMENTS 1671703 10/1971 Fed. Rep. of Germany .
2459009 6/1976 Fed. Rep. of Germany .
0176875 10/1983 Japan .
0532581 1/1941 United Kingdom .
0968285 9/1964 United Kingdom .

Primary Examiner—Donald L. Walton
Attorney, Agent, or Firm—Simon J. Belcher; Herbert G. Burkard

[57] ABSTRACT

Sensitive material, e.g. lithium electrode material, is provided with a protective layer of fluid-impermeable material, which is subsequantly rendered permeable by altering its physical structure, e.g. by perforation, without altering its composition. The permeable material can act, for example, as an electrode separator when the resulting article is assembled into an electrolytic cell, and the protected material can be processed, e.g. rolled into thin sheets, and conveniently fed to automatic assembly apparatus.

5 Claims, 3 Drawing Sheets

PROTECTION OF SENSITIVE MATERIAL

This application is a continuation of application Ser. No. 210,142 filed June 15, 1988 now abandoned, which is a continuation of application Ser. No. 618,092, filed June 7, 1984, now abandoned.

This invention relates to protection of sensitive materials from physical damage and/or contamination and/or undesirable chemical reaction.

Removable coatings, for example soluble coatings, have been used to protect, for example, sensitive surfaces against scratching, or sensitive drugs against premature reaction or contamination. Liquid-permeable coatings have also been used, for example, to control release of drugs in the human body.

The present invention provides a method of making an article comprising a body of sensitive material at least part of which body is protected by fluid-permeable protective material, comprising the steps of (a) providing a body of sensitive material at least part of which is protected by relatively fluid-impermeable protective material and (b) altering the physical structure of the protective material in situ to render it relatively fluid-permeable without significantly altering its composition.

Preferably the protective material before the alteration of its structure is sufficiently impermeable at least to hinder significantly the intended end use function of the sensitive material.

More preferably, the protective material will be sufficiently impermeable substantially to prevent the sensitive material from performing its intended end use function and the protective material will require the alteration of its structure to render it sufficently permeable to perform that function. Materials capable of this alteration of structure may however include protective materials which are already in condition to enable the sensitive material to perform its end use function, the structural alteration either enhancing that function or enabling further useful effects to be obtained.

The process according to this invention has the advantage that the protective material can serve two purposes. Firstly, in its relatively fluid-impermeable state, it gives most protection against physical and chemical damage. Secondly, after alteration into the more fluid-permeable state, it permits greater access of fluids to the sensitive material for various desirable ends to be described hereinafter, while still providing a degree of physical support and protection. Accordingly, relatively thick protective films can be used while still permitting adequate access of fluids for end use purposes.

This retention of the relatively fluid-permeable protective material can be useful in end uses where a porous physical barrier would otherwise have to be supplied separately. For example, when the sensitive material is an electrode for an electrical device, the protective material may act as a ready-assembled electrode separator, thus eliminating some of the problems of handling electrodes and separators during the assembly of the electrical devices. Such handling problems can be acute in devices having highly reactive electrode materials, for example lithium cells.

It will be understood that the sensitive material may be selected from a wide range of materials which may be "sensitive" in many different ways, for example materials which are subject to attack by atmosphere or moisture during storage; materials which may react prematurely with liquid with which they may come into contact in use; catalyst materials which are subject to poisoning by contaminants during storage; and materials which lack physical strength or integrity and thus require protection from physical damage. The invention is especially useful for sensitive materials which require physical protection owing to brittleness or other physical weakness while permitting access of fluids to the material in use but not in storage. The dual function of the convertible protective material according to the present invention is thus highly convenient, since the remaining permeable material can provide this physical protection. By suitable selection of its ingredients, the protective material can also be made to perform other secondary functions, for example providing chemical reactants or catalysts in a porous layer on the surface of the sensitive material.

It will be understood that references to altering the structure of the protective material in situ mean that the alteration is carried out while the protective material is protecting the sensitive material, that is without removing it from its protective association with the sensitive material. References to altering its structure without significantly altering its composition are not- intended to exclude the possibility of some minor or localised compositional changes brought about by the structural alteration process. For example, when the protective material is perforated by a laser beam, some compositional changes might occur in the immediate vicinity of individual perforations.

The sensitive material may be coated with the protective material, or may be enclosed by a nonadherent, preferably self-supporting, layer of the protective material.

The protective material will preferably be flexible and may be selected according to the properties required, and may comprise organic material or polymeric material, organic polymers being preferred, for example polymers of compounds with polymerizable double bonds and condensation polymers of condensable compounds.

Useful polymers of compounds with polymerizable double bonds may be selected from polymers of ethylenically unsaturated hydrocarbons having 2 to 12 carbons, such as ethylene, propylene, n-hexylene, n-dodecene or 4-tert butylstyrene and of vinyl ethers such as methyl or ethyl vinyl ether. Preferred among these compounds are polyethylene and polypropylene due to their low cost.

Copolymers of the above monomeric compounds are also useful compositions.

Useful condensation polymers may be selected from self-condensates of omega-amino-fatty acids and their lactams, such as condensation polymers from caprolactam and from 11-amino-undecanoic acid.

The condensation polymers can be polyamides of diamines having 6 to 9 carbons and dicarboxylic acids having 6 to 10 carbons. Typical useful diamines include hexamethylenediamine, nonamethylenediamine and aryldiamines such as m- and p-phenylenediamine. Typical useful dicarboxylic acids include adipic acid, suberic acid, azelaic acid, terephthalic acid and isophthalic acid. The preferred polyamide is the condensate of hexamethylenediamine and adipic acid, for reasons of general availability. The condensation polymers can also be selected from polyesters of aryldicarboxylic acids such as phthalic, terephthalic and isophthalic acids and glycols having 2 to 6 carbons, such as ethylene, butylene- and hexylene-glycols.

Useful polymers include
Ethylene/chlorotrifluoroethylene copolymers
Poly(2-methylpropene)
Polypropylene
Polyethylene
Poly(4-tert-butylstyrene)
Polystyrene
Poly(vinyl methyl ether)
Poly(6-aminocaproic acid
Poly(11-aminoundecanoic acid
Poly(ethyleneterephthalate)
Poly(decamethylene sebacamide
Poly(heptamethylene pimelamide)
Poly(octamethylene suberamide)
Poly(nonamethylene azelaamide)
Poly(hexamethylene adipamide)

The protective material can be formulated so as to permit the alteration of its structure either by contact with a fluid, or independently of any fluid contact, for example by heating or perforation or stretching. When heating is used, the protective material may for example comprise heat-shrinkable material which is shrunk by the heating to alter the structure, preferably opening pores therein. Creation of pores may also be effected by stretching the protective material, although alteration by stretching need not specifically create pores provided that the material is rendered adequately permeable. Alteration by perforation may be effected by exposing the protective material to penetration by radiation, particle bombardment or an electric field, preferably by laser beam, or by mechanical punching. Radiation, particle bombardment, or electrical fields may be applicable in other non-penetrating manner to effect the structural alteration in suitable materials. Alteration by fluid contact may involve contacting the protective material with a fluid, preferably a liquid, which is a component of an electrical device in which the article is incorporated. This has the advantage that a cell electrode, for example, may be protected by the protective coating until it is assembled into the cell, whereupon the protective material is converted, by contact with the liquid electrolyte component of the cell, into an electrode separator. The protective composition will preferably be substantially non-reactive with the sensitive material, although useful interactions of the sensitive material and the protective composition are not excluded.

It will be understood that conversion from a substantially non-porous state to a porous state frequently occurs in practice and may be preferable in many cases to other ways of achieving fluid permeability, e.g. by conversion to a liquid-swellable state without creation of pores.

The sensitive material may be deformed while protected by the protective material so as to reduce the thickness of the sensitive material or to otherwise form it, e.g. to alter its surface configuration, to suit particular end-uses. This has substantial advantages when the sensitive material is highly reactive and/or physically weak, and is especially useful for making electrodes for electrical devices out of highly reactive materials, for example alkali metals or alkaline earth metals. For such deformation it is advantageous for the sensitive material to be a metal which is malleable under temperatures and pressures which do not unacceptably damage the protective layer.

Such devices, for example lithium cells, may use thin strips or sheets of the reactive metal as electrodes, and the cost and difficulty of handling such metals tends to increase rapidly as the thickness decreases. Rolling of lithium strips to reduce their thickness, or otherwise alter their form or surface configuration, can be effected relatively easily while the lithium is protected by the protective material according to this invention, since the protective material reinforces the metal and provides a readily handleable product. In this way, thin sheets of lithium, for example of about 0.075 millimeters thickness, which would otherwise be difficult and expensive to make and handle, can be produced from more readily available 0.25 millimeter strip. The relative impermeability of the protective material tends to reduce the need for dry room handling. However, longer term storage in dry fluid-tight cannisters is desirable, since the protective materials of most interest, especially those based on organic polymers, will tend to transmit moisture vapour over extended periods.

The protective material may be deformed, either independently or in connection with deformation of the sensitive material, to alter its structure as aforesaid to render it relatively fluid-permeable, or to facilitate subsequent alteration of its structure for that purpose.

The article produced by this method may include at least one additional material capable of functioning in the end use of the article in addition to the sensitive material and the protective material. For example a current collector may be present on one or both faces of a lithium electrode, and it will be appreciated that references to the protective material "protecting" or "adhering to" the sensitive material do not exclude such possibilities of one or more materials intervening between the sensitive material and the protective material.

This invention includes methods where the protective material is converted in situ in the device into the fluid permeable state. Of particular interest are those methods wherein the sensitive material is capable of functioning as an anode or cathode for an electrical device and the permeable protective material is capable of functioning as an electrode separator.

The invention also provides a method of making an electrical device comprising (x) making an article by the method according to this invention, and (y) incorporating the article in the device.

The alteration may be effected either before or after the article is incorporated in the device using any of the aforementioned techniques as appropriate. The method may include the step of deforming the sensitive material while protected by the protective material, so as to alter its surface configuration and/or to decrease the thickness of the sensitive material, as hereinbefore discussed.

The invention lends itself to efficient assembly methods wherein an article is made by the method according to the invention and fed to apparatus which assembles portions of the article into a plurality of electrical devices, (or other finished goods), especially where the apparatus receives a substantially continuous feed of the article and automatically assembles successive portions thereof into a succession of the electrical devices or other goods. Production equipment capable of carrying out an automated process of this kind can readily be devised, given the article and other principles outlined above. The equipment may conveniently include means for stretching the article so as to render the protective material fluid-permeable, and/or may include other means for rendering the material fluid-permeable.

As applied to manufacture of electrical devices in which the sensitive material is to serve as an electrode, it is a further advantage of the present invention that the electrode article may be provided in the form of a long, continuous, preferably coiled strip for feeding to automatic equipment capable of cutting off portions of the article and assembling the successive portions into a succession of the electrical devices as aforesaid, preferably automatically and continuously. The advantages of such an automated process over the piece-by-piece hand assembly methods hitherto used in the absence of articles prepared according to this invention, especially for alkali metal or alkaline earth metal electrode materials, will be appreciated. In this aspect of the invention, the protective material could be of elongate form but not adherent to the continuously feedable strip of electrode material, for example in the form of a tube surrounding the strip. However, adherent protective material is preferred.

Such electrode articles made by the method according to this invention can be assembled with the opposing electrode material and other components of the electrical device, with fewer difficulties than are encountered in handling and aligning unprotected electrode materials, especially reactive metals such as alkali metals or alkaline earth metals. The anode or the cathode, or both, of suitable electrical devices, for example electrical cells, may be provided by way of articles according to this invention, reactive metal anodes, especially lithium anodes, for electrical cells, especially non-aqueous cells, being an important practical application of the articles. The articles may include other components, for example current collector layers, as known per se, on part of the electrode material, e.g. on one major surface of a flat strip electrode. Such current collector layers, being electrically conductive, will normally be overlaid by insulating material such as the protective material of the present invention, but other arrangements may be contemplated to suit other additional components when making the articles for these or other purposes.

The protective material may be prepared in any convenient way, for example by melt blending suitable organic polymeric materials alone or with other desired ingredients such as fillers, antioxidants, cross-linking agents, or by solution blending such ingredients in a suitable solvent. Application to the sensitive material will naturally be effected by methods which do not unacceptably affect the sensitive material, and the protective material itself will preferably not interact with the sensitive material, although beneficial interactions are not excluded. Pressure lamination, solvent casting, and preferably extrusion coating (which is new and advantageous for cell electrodes) may be mentioned as examples of methods for producing and applying the protective materials. The protective material will be formulated so as to achieve the void volume, pore size, uniformity and other characteristics necessary for its intended end use, for example by selecting appropriate particle size and/or loading of particulate ingredients as aforesaid, and/or controlling their degree of dispersion in the protective material. It is an advantage of this invention that higher pore volumes can be tolerated than would be possible with self-supporting porous films which must have sufficient strength for handling and laying up with the sensitive material, for example as in known lithium cell assembly methods.

Cross-linked protective materials, especially polymers cross-linked by ionising radiation, may have beneficial temperature or solvent resistance or other desirable properties, especially when cross-linked to a gel content of at least 60% as measured by ANSI/ASTM D2765-68.

Some examples of the preparation of protective materials and evaluation of their relevant properties when applied to lithium will now be described by way of illustrating the invention.

EXAMPLE 1

Medium density polyethylene (Sclair 8405 from du Pont) was produced in thin film form using a Baughn 32 mm single screw extruder (L/D ratio - 25/1). The film was 0.25 mm thick. Stretching of this film using an Instron Tensile Tester was done with initial stretching to 25% elongation at 23° C. followed by a further 150% elongation at 100° C. The stretched and unstretched films were laminated to lithium strip and evaluated using the conductivity cell as in FIG. 1 to determine whether the stretching had changed the permeability of the film to a conducting solution of lithium bromide - acetonitrile (0.5M).

The specific conductivity across the unstretched film was determined to be $3 \times 10^{-6}$ ohm$^{-1}$ cm$^{-1}$ while for the stretched film the corresponding value was $3.5 \times 10^{-5}$ ohm$^{-1}$ cm$^{-1}$, thus making the stretched film significantly more accessible to fluids.

EXAMPLE 2

Sclair 8405 was again used to produce an excapsulant for lithium. The Baughn 32 mm single screw extruder (L/D ratio 25/1) was used with lithium foil (as supplied by Foote Minereal Co) fed through a crosshead die and encapsulated in a drawn-down tube of the polymer. Lamination was completed by drawing the composite between nip rolls immediately following extrusion.

The lithium was stretched to a total of c.300% in two stages. Elongation of c. 15% was achieved initially at −40° C. followed by the remainder of the c.300% elongation at 60° C. Elongation was effected by rolling the laminate between nip rolls of constant nip to reduce thickness and cause elongation when the laminate was drawn through the nip under tension.

The stretched and unstretched laminates were evaluated using a conductivity cell as in FIG. 1 of the accompanying drawings with the solution in the cell being 0.5 M LiCF$_3$SO$_3$ in a 50/50 solution of dimethoxyethane and propylene carbonate. The specific conductivity across the unstretched polyethylene encapsulant was found to be c.$9 \times 10^{-8}$ ohm$^{-1}$ cm$^{-1}$. The corresponding value for the stretched polyethylene encapsulant was found to be within the range $5 \times 10^{-6}$ to $1 \times 10^{-5}$ ohm$^{-1}$ cm$^{-1}$.

In these Examples, the conductivity tests were conducted as follows, referring to the conductivity cell shown schematically in FIG. 1 of the accompanying drawings.

A sample of the laminate of polymer (1) with connections to the lithium (2) made by pieces of nickel mesh (3) was sealed in the conductivity cell by O-rings (4). The specified electrolyte solution was added and the conductance of the polymer was measured on both sides of the lithium using electrodes (6) and conductance bridges (7,8).

EXAMPLE 3

Figure 2:
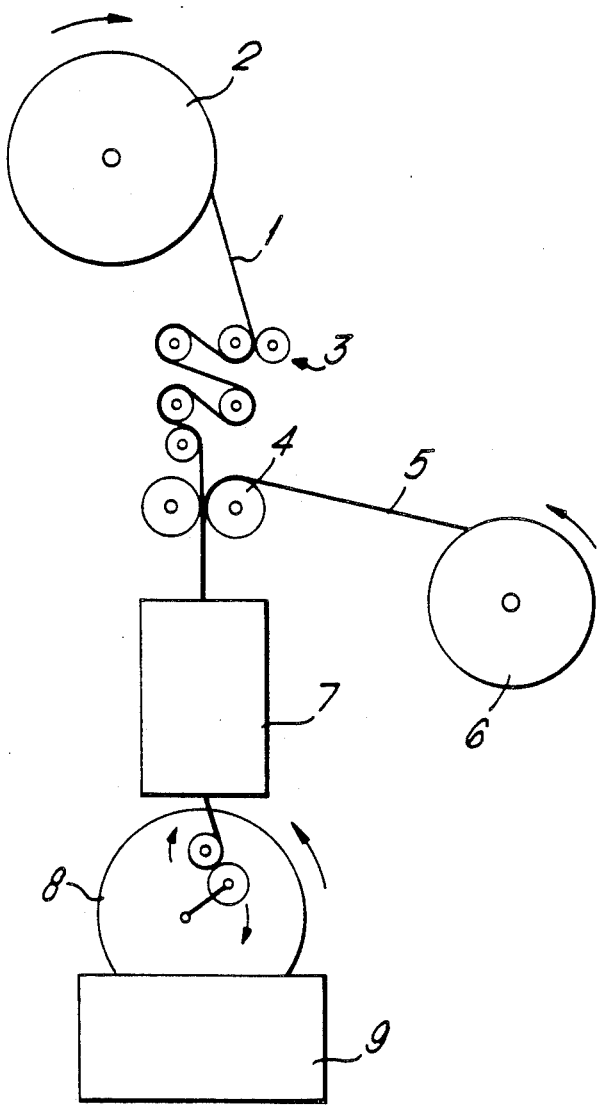

FIG. 2 of the accompanying drawings illustrates schematically electrical cell production equipment capable of performing a method of making an electrical device according to this invention.

Referring to FIG. 2, a strip (1) of lithium anode material protected by polymeric protective material which has been stretched to render it porous (at the same time thinning the lithium) according to the invention is fed from a supply roll (2) via feed rolls (3) to lay-up rolls (4) where a strip (5) of cathode material from feed roll (6) is closely aligned with the protected anode, non-porous protective material carried by the lithium anode being between the anode and the cathode. The aligned anode/cathode assembly then proceeds to a spool threading unit (7) and thence to a spool winding unit (8) wherein the assembly is coiled or spooled to provide a coiled electrode assembly. The coiled assembly then passes to the spool casing unit (9), where the coiled assembly is sealed in a cell casing together with suitable electrolyte liquid. Suitable practical embodiments of the production equipment thus schematically described can readily be devised.

Figure 3:
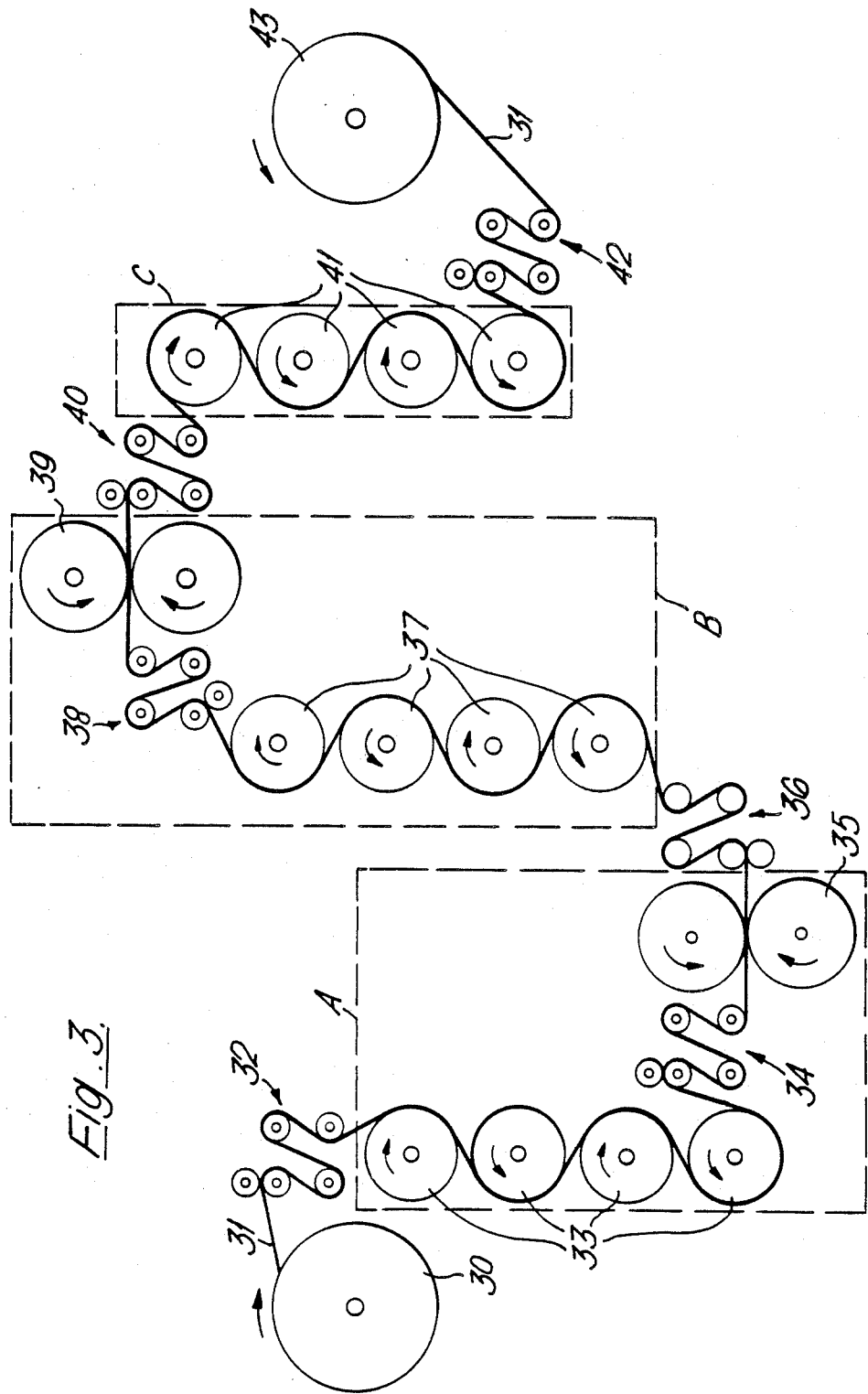

The step of stretching or otherwise treating the protective material to render it fluid-permeable may be included by means of suitable apparatus, an example of which is shown schematically in FIG. 3 of the accompanying drawings.

The lithium/polymer article 31 is shown coming from a feed roll 30, but could if desired come directly from the extrusion or lamination apparatus which forms the article. The article 31 passes via feed rolls 32 to a low-temperature stretching unit A wherein the article is cooled by chilling rolls 33 and passes via guide rolls 34 to stretching nip rolls 35 which are driven faster than the rate of feed so as to impart an initial "cold" stretch to the protective polymer.

The cold stretched article then passes via feed rolls 36 to a higher temperature stretching unit B wherein heating rolls 37 warm the polymer before passing it, via guide rolls 38 to stretching nip rolls 39 which impart "hot" stretch to the polymer.

The article, with the protective polymer now stretched to a fluid-permeable condition adequate for its intended function as an electrode separator, then passes via feed rolls 40 to an annealing unit C, wherein controlled temperature annealing rolls 41 relieve excess stresses in the article 31 before passing it via feed rolls 42 to take-up rolls 43. The take-up roll 43 could if desired be replaced by a direct feed into automatic cell assembly equipment according to this invention.

The electrode article made by the method according to this invention may be assembled with a melt extruded cathode material, preferably an electrically conductive composite comprising polymeric material and a suitable cathodic filler, for example polyethylene oxide filled with manganese dioxide. The cathode may be extruded directly onto the protected anode material and other components such as current collectors to produce an electrical device.

It may be desirable to cause the cathode, whether extruded or not, to be porous so as to permit access of electrolyte liquid through the cathode to the other components of the device.

We claim:

1. A method of making a protected electrode, which comprises:
   (a) providing a body of a reactive metal which is capable of functioning as an electrode in an electrochemical device, at least part of the body being protected by a layer of fluid impermeable polymeric material; and
   (b) stretching the layer of polymeric material, and the body of reactive metal while protected by the polymeric material, so that (i) the thickness of the body of reactivated metal is reduced significantly, and (ii) the fluid permeability of the polymeric material is increased sufficiently to allow it to function as an electrode separator in an electrochemical device, without significant alteration of its composition.

2. A method as claimed in claim 1, in which the body of reactive metal is at least partly enclosed by a non-adherent self-supporting layer of the protective polymeric material.

3. A method as claimed in claim 1, in which the reactive metal is an alkali metal or an alkaline earth metal.

4. A method as claimed in claim 3, in which the reactive metal is lithium.

5. A method as claimed in claim 1, in which a component in the form of a layer of conductive material is included in physical and electrical contact with the reactive metal, for use as a current collector in the said electrochemical device.

* * * * *